Sept. 7, 1943.  C. C. VOGLESONG  2,328,696
BUNG-SPUT
Filed March 28, 1941
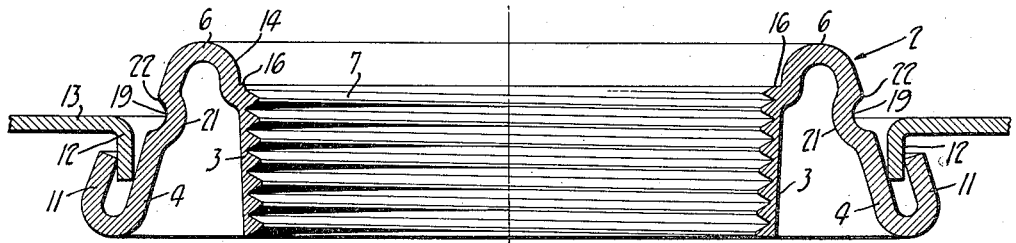
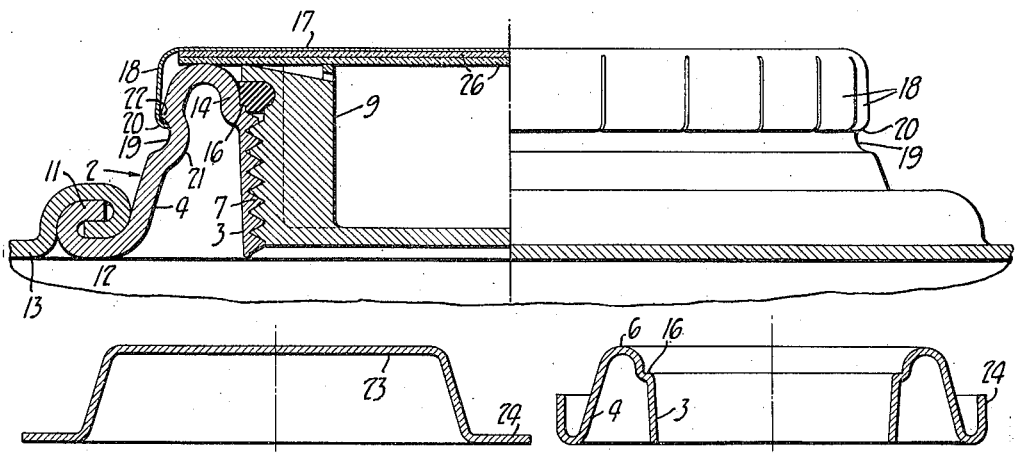
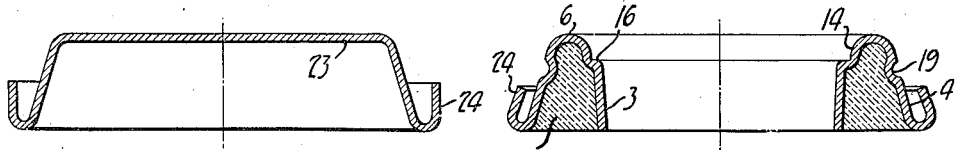
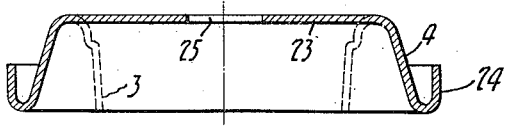
INVENTOR
Clyde C. Voglesong
BY Joseph B. Gardner
ATTORNEY Patented Sept. 7, 1943

2,328,696

UNITED STATES PATENT OFFICE 2,328,696

BUNG SPUT

Clyde C. Voglesong, Oakland, Calif.

Application March 28, 1941, Serial No. 385,621

1 Claim. (Cl. 220—39)

The invention relates to a bung-sput or flange designed for application to heavy duty metal containers such as drums, barrels, and tanks. More particularly the invention relates to a sput or flange which is provided with a threaded bore or opening for the reception of what may be termed a standard type of closure plug. The latter has a threaded body for engagement with the threaded part of the sput opening, and an enlarged head between which and the threaded part is carried a sealing gasket which, when the plug is screwed home, is compressed between the plug head and a seat on the sput so as to seal the opening. In most cases the gasket seat on the sput is located at or adjacent the rim of the opening, and by reason thereof, when the opening is sealed by the plug, the head of the plug protrudes outwardly from the rim. Many users of containers involving this type of bung require that in addition to the provision for sealing of the opening by the plug, there be provided a sealing cap or cover over the plug and sput so that in case the plug is loose the opening may still be sealed, or if desired the cap may be used to cover the opening in place of the plug. Generally the cap or the plug is provided with some contrivance for sealing the one or the other against unauthorized removal and for detecting such removal. As may be perceived, by reason of the protrusion of the plug from the sput, or the engagement of the rim opening by the gasket or head of the plug, such rim is not available for effective use as a seat for the gasket of the sealing cap, or at any rate prevents the use with the sput of any cap except such as may be specially designed for such sput and plug combination. There is on the market a type of sealing cap which owing to its many advantages is in general use, but owing to its peculiar construction and mode of operation it cannot be applied or used with the sput and plug combination as above described. A cap of this type is known under the trade name of "U-Pressit" and its mode of operation is such that when pressure is applied to the sides of the cap, the latter will contract to secure the cap in place whereas when pressure is applied to the center of the cap, the sides will expand to release the cap. To permit the use of this type of cap, there must be provided on the member with which it is to be associated, not only an adaptable seat for the cap gasket but an anchoring means for the gripping portions of the cap. The anchoring means must be in appropriate relation to the seat and located on the exterior of the member, and it will thus be apparent the cap can be applied only where the member projects outwardly from the wall of the container on which the member is mounted, or at least only where the sides of the member are exposed and unencumbered. In most of the bung-sputs as heretofore provided, the design and construction of the sput or the manner of assembly of the sput on the container wall, makes impossible or impractical the provision of the necessary cap-anchoring means on the sput. This is also true in respect to providing the sput with appropriate means for the seating of the two gaskets, that is, of the cap and plug. Possibly where the sput is cast or made of relatively thick plate, the parts might be machined in an effort to provide the required design and construction, but this would be generally objectionable since a cast structure is not conducive to afford joinder of the sput to the container wall by an adequate lock-seam, and in either case the machining and other operations would render the cost of production of the sput prohibitive.

In view of the foregoing, it has been an object of my invention first, to provide a bung sput which will permit the use therewith of the "U-Pressit" type cap together with the aforementioned standard closure plug, and second, to incorporate the structure necessary for accommodating the aforementioned cap and plug in a type of sput construction which will make possible the incorporation as such in a practical manner and without entailing any radical change in the design of such sput, particularly in respect to the otherwise effective accommodation of the plug and the application of the sput to the container in a most approved manner.

Another object of the invention is to incorporate the features of my invention in a sput formed of sheet metal of uniform and if desired of the same thickness as the container wall to which the sput is applied, and to incorporate such features in the sput in such manner that the original uniform thickness of the sput will still be maintained throughout the entire sput structure and at the same time the original relation of the parts for receiving the plug and applying the sput to the container wall will be retained.

A further object is to provide a sput having all of the features of the reception of the plug and the cap in accordance with my invention, which may be made in one piece of sheet metal of uniform thickness and formed entirely by die stamping and spinning except for the threads.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim:

Referring to said drawing:

Figure 1 is a longitudinal sectional view of a sput constructed in accordance with my invention and showing same ready for insertion in a container wall.

Figure 2 is a view similar to Figure 1 but showing the sput operatively attached to the container wall and with a plug and cap applied thereto.

Figures 3 to 7 inclusive are longitudinal sectional views of the sput at different stages in the formation thereof.

As previously explained, I form the sput of sheet metal, and I find that stock of a gauge which will permit of securing the sput to the container wall by a lock-seam joint, is sufficiently flexible to make practical the utilization exclusively of die-stamping and spinning operations for forming the gasket seats and cap-anchoring means on the sput. By use of the sheet metal not only can I thus provide for a lock-seam connection and permit the manipulation of the metal to provide for the anchoring and seat arrangement of my invention, but I can utilize a certain basic form of sput design to permit application of the die and spinning means to the sput structure to produce most effective operation and results. The design referred to is of the type comprising spaced inner and outer concentric tubular portions joined together at the top and arranged for attachment to the container by a lock seam joint effected between the bottom of the outer portion and the wall portion of the container surrounding the opening in which the sput is inserted. In this design the inner portion of the sput is threaded for the reception of the plug and as heretofore made, the joined end of the portions provides a seat for engagement by the plug gasket when the plug is screwed into the sput.

By reference to the drawing it will be seen that I have adopted in general the design above described, and as here shown the sput comprises a one-piece sheet metal member 2 formed with inner and outer tubular portions 3 and 4 arranged in spaced and concentric relation and joined at the top by an intermediate portion 6. On the inner surface of the portion 3 are provided screw-threads 7 designed for engagement with corresponding threads of the plug 9 used with the sput. Preferably, the portion 3 tapers slightly inwardly from the top to the bottom but the threads 7 are cut cylindrically so as to leave the upper threads foreshortened and thereby permit the plug to more readily accommodate itself for proper cooperation with the sput upon insertion of the plug therein. This feature is quite desirable from a practical standpoint, since in many instances plugs of different makes will be applied to the sput and some may not exactly fit.

The outer portion 4 of the member 2 is formed at its free extremity with a locking flange 11 which is designed for cooperation with a complementary flange 12 of the wall 13 of the container in which the sput is inserted. The portion 4 extends outwardly from the top to the bottom, and to a degree and of a curvature which will insure proper entry of the flange 12 in flange 11 when the connection of the flanges and the formation of the seam thereby is effected, it being noted in this regard that in forming such seam, the flange portions are primarily assembled and formed in longitudinal relation to the sput axis, as shown in Figure 1, but when completed the portions are bent so that they extend transversely of such axis, as shown in Figure 2.

In this type of sput as heretofore designed, the seat for engagement of the plug gasket, was directly upon the outer surface of the connecting part between the inner and outer portions, and in this manner the head of the plug as well as the plug gasket will protrude from the sput and prevent the application to the sput of the cap as previously explained. In the sput as I construct it, the threaded part of portion 3 includes only what may be called the lower part of such portion so that there is left an unthreaded part 14 contiguous with the intermediate portion 6. The threaded part and the unthreaded part are in offset relation, with the threaded part of smaller diameter whereby a seat 16 for the plug gasket is provided at the juncture of said parts. The unthreaded part 14 is long enough to enable the plug gasket and the plug head to be completely accommodated therein when the plug is screwed home in the plug, it being noted in this connection that the outside diameter of the plug head, as well as that of the gasket before compression, is less than the smaller diameter of the part 14.

The cap with which my sput is particularly adapted for use is illustrated in Figure 2. This cap is of the type which is marketed under the trade-mark "U-Pressit" and as here show, comprises a sheet metal body portion 17 having a slitted peripheral extension which is bent downward to provide a plurality of resilient tongues 18. The free ends of the tongues are bent inwardly to form detents 20 which are designed to clutch some part of the sput so as to anchor the cap to the sput. Within the cap and coextensive with the body is a circular gasket 26 which as will be seen from the drawings, overlies and rests upon the intermediate portion 6 of the sput. It will thus be clear that the sput provides a seat for the cap gasket as well as a seat for the plug gasket.

For affording a means of engagement of the detents 18, an annular groove 19 is provided in the sput, and as here shown, such groove is formed in the outer portion 4 about midway between the portion 6 and the flanged end. Since there is considerable space between the inner and outer portions at the point of location of the groove, the latter may be formed by pressing a part 21 of the outer portion inwardly. By thus forming the groove, there will be provided along the upper edge thereof a shoulder 22 on which the detents may catch to hold the cap to the sput.

The body in this type of cap shown is designed to operate as a clicker disc, that is it may be flexed to either convex or concave form at the top of the sput. When the body is flexed inwardly the tongues become extended so that the cap may be inserted on or released from the sput, but when the body is flexed outwardly the tongues become contracted, whereby the detents may enter the groove and anchor the cap in position. When the cap is in locked position on the sput, release of the detents is obtained by simply depressing the body at the center, and conversely to produce the upward flexure of the body when the cap is on the sput, pressure is exerted inwardly upon the peripheral portion of the body with the portion 6 serving as a fulcrum. Since the plug is hollow at the top and will seat completely within the sput, and likewise since the cap body may teeter freely on the portion 6, the proper operation and functioning of this type of cap is readily permitted. As will be clear, when the detents are moved into the groove, the cap gasket will be firmly pressed against the portion 6, whereby an effective seal will be provided independent of the plug seal. It is important to note that since the sput portions 4 and 6 are structurally formed free and independent of the container or the plug receiving portion of the sput, such portions may be shaped or worked without interfering with the functions thereof or of the rest of the sput or the attachment of the sput with the container. For instance, the groove may be provided by indenting a middle section of portion 4, and likewise the offset between the threaded and unthreaded parts of the inner portion is effected without affecting the relationship between such parts and any part of the sput or container.

To form the sput, a blank disc of appropriate size is cut from sheet metal of the required gauge, and such disc is then deformed in a suitable die to provide an inverted bowl-like portion 23 with a rim portion 24, as shown in Figure 3. The next step in the process is to fold back the rim portion 24 so that it will lie opposite the sides of the portion 23. This is illustrated in Figure 4. Thereafter, as indicated in Figure 5, an opening 25 is punched in the base of the portion 23, and the rest of the base depressed as shown in Figures 5 and 6 to form by one operation the inner member 3 with its parts of different diameters including both seats 6 and 16. This simple and effective forming operation is made possible by the fact that a female die may be inserted in the bowl portion and allowed to remain therein for coaction with the male die for the entire operation and then readily removed when required.

After the last mentioned operation the portion 24 is folded inwardly still further, as shown in Figure 6, until the angle thereof is appropriate for effecting the lock-seam joint with the container wall as previously set forth. The sput is now ready for the formation of the groove in the outer member 4 thereof, and this may be done by mounting the sput upon a mandrel and then rolling the groove in the member by forcing a roller transversely thereagainst while the sput is rotated, it being noted that the groove is placed on the part of the member above the portion 24 so that a roller of appropriate form and size may be afforded proper access to the member. The portion 14 may be tapped either before or after the grooving operation.

The sput is thus complete and ready for application to the container. In some instances where it is desirable to insure an absolute extraction of all the contents in the container, the space between the inner and outer members of the sput may be filled with some light metal or other filler material. Preferably the filler 31 is provided by casting the material in place, the grooved portion of the outer member serving to anchor the filler in place.

I claim:

In means of the character described, a one-piece sheet metal bung-sput including inner and outer tubular concentric portions having their body portions spaced from each other and joined at one end to provide thereat a sealing cap seat, said inner portion comprising an interiorly threaded inwardly tapered part and an upper outwardly offset portion, the latter forming an inner seat for a gasket, said threaded portion being tapered from the top to the bottom but with the threads cut cylindrically, a slightly tapered closure plug having a threaded portion for engagement with said threaded part and a head arranged for insertion in said other part of said inner portion and to engage said second seat, said plug and sput being so designed and related that when the second seat is operatively engaged by the plug the head of the plug will be substantially no further outward than said cap seat, said outer portion having its free end arranged for joinder with the container wall and being provided intermediate its ends with an inwardly bent part forming an external peripheral sealing cap anchoring-groove, and a sealing cap arranged for operative positioning over said sput and plug with a portion engaging said cap seat and a portion seated within said groove.

CLYDE C. VOGLESONG.